US011627828B2

(12) United States Patent
Kuang

(10) Patent No.: US 11,627,828 B2
(45) Date of Patent: Apr. 18, 2023

(54) LOCKING BREWING DEVICE, BEVERAGE BREWING DEVICE AND BEVERAGE MACHINE

(71) Applicant: Guangdong Midea Consumer Electric Manufacturing Co., Ltd., Foshan (CN)

(72) Inventor: Jian Kuang, Foshan (CN)

(73) Assignee: GUANGDONG MIDEA CONSUMER ELECTRIC MANUFACTURING CO., LTD., Foshan (CN)

( * ) Notice: Subject to any disclaimer, the term of this patent is extended or adjusted under 35 U.S.C. 154(b) by 589 days.

(21) Appl. No.: 16/630,130

(22) PCT Filed: Oct. 10, 2017

(86) PCT No.: PCT/CN2017/105488
§ 371 (c)(1),
(2) Date: Jan. 10, 2020

(87) PCT Pub. No.: WO2019/010848
PCT Pub. Date: Jan. 17, 2019

(65) Prior Publication Data
US 2020/0154933 A1  May 21, 2020

(30) Foreign Application Priority Data
Jul. 10, 2017 (CN) .......................... 201710555254.3

(51) Int. Cl.
*A47J 31/36* (2006.01)
*A47J 31/46* (2006.01)
*A47J 31/40* (2006.01)

(52) U.S. Cl.
CPC ....... *A47J 31/3642* (2013.01); *A47J 31/3628* (2013.01); *A47J 31/3633* (2013.01);
(Continued)

(58) Field of Classification Search
CPC .... A47J 31/3633; A47J 31/407; A47J 31/461; A47J 31/3642; A47J 31/3695; A47J 31/468; A47J 31/3628; A47J 31/4467
See application file for complete search history.

(56) References Cited

U.S. PATENT DOCUMENTS

| 2011/0162530 | A1* | 7/2011 | Castellani | A47J 31/3638 99/279 |
| 2013/0236609 | A1* | 9/2013 | Magniet | A47J 31/0642 426/87 |
| 2015/0216349 | A1 | 8/2015 | Guo et al. | |

FOREIGN PATENT DOCUMENTS

| CN | 204232918 U | 4/2015 |
| CN | 204765085 U * | 11/2015 |

(Continued)

OTHER PUBLICATIONS

World Intellectual Property Organization (WIPO) Written Opinion for PCT/CN2017/105488 with translation dated Apr. 10, 2018 7 Pages.

(Continued)

*Primary Examiner* — Dana Ross
*Assistant Examiner* — Kuangyue Chen
(74) *Attorney, Agent, or Firm* — Anova Law Group, PLLC

(57) ABSTRACT

A locking brewing device includes a seat body configured to mount a material cup and including a piston chamber with an open end and a closed end, a piston slidably and sealedly arranged in the piston chamber and configured to lock a beverage capsule in the material cup, and a liquid guide piercing tube arranged at a surface of the piston that faces the open end of the piston chamber and being configured to pierce the beverage capsule in the material cup and deliver liquid. The piston and the closed end of the piston chamber form a pressure medium chamber having an opening, and
(Continued)

the piston includes a liquid inlet passage in communication with the liquid guide piercing tube.

20 Claims, 10 Drawing Sheets

(52) U.S. Cl.
CPC .......... *A47J 31/407* (2013.01); *A47J 31/461* (2018.08); *A47J 31/468* (2018.08)

(56) References Cited

FOREIGN PATENT DOCUMENTS

| | | | |
|---|---|---|---|
| CN | 204765085 U | | 11/2015 |
| CN | 105433789 A | | 3/2016 |
| CN | 106136887 A | | 11/2016 |
| CN | 205923767 U | * | 2/2017 |
| CN | 205923767 U | | 2/2017 |
| EP | 2432354 | | 11/2010 |

OTHER PUBLICATIONS

World Intellectual Property Organization (WIPO) International Search Report for PCT/CN2017/105488 dated Apr. 10, 2018 6 Pages.
The European Patent Office (EPO) Extended Search Report for EP Application No. 17917228.3-1004 dated May 20, 2021 5 Pages.

* cited by examiner

LOCKING BREWING DEVICE, BEVERAGE BREWING DEVICE AND BEVERAGE MACHINE

CROSS-REFERENCE TO RELATED APPLICATIONS

This application is a National Stage Entry under 35 U.S.C. § 371 of International Application No. PCT/CN2017/105488, filed Oct. 10, 2017, which claims priority to Chinese Application No. 201710555254.3, filed Jul. 10, 2017, the entire contents of both of which are incorporated herein by reference.

TECHNICAL FIELD

The present disclosure belongs to the field of home appliances, in particular to a locking brewing device, a beverage brewing device, and a beverage machine.

BACKGROUND

With the improvement of people's life quality, coffee machines become more and more popular. For example, when a coffee brewing machine is used to brew Italian high-pressure coffee, the seal ring of the top cover of the brewing chamber where the coffee capsule is located must have enough downward pressure (usually up to 300 kg force) to maintain good sealing performance, owing to the high water pressure.

To that end, many existing capsule beverage machines employ a chamber pressure brewing structure, which requires the operator to manually press a handle to drive a locking structure to move towards the beverage capsule, in order to lock the beverage capsule. However, the manually operated structure is complex, has high cost, and is difficult to disassemble. In addition, the operator has to apply great pressing force to the handle. Therefore, the operation is inconvenient.

In view of those drawbacks, it is a new research and development direction to seek a novel brewing locking mechanism that is economical and practical, has reliable working performance, and is easy to operate.

SUMMARY OF THE DISCLOSURE

In view of the above drawbacks or defects in the existing technologies, the present disclosure provides a locking brewing device, which has reliable working performance, and can lock the beverage capsule conveniently, quickly and reliably without a pressing operation of the user.

To attain the above object, the present disclosure provides a locking brewing device for a beverage machine. The locking brewing device comprises a seat body for mounting a material cup, a liquid guide piercing tube for piercing the beverage capsule in the material cup and delivering liquid, and a piston for locking a beverage capsule in the material cup, where a piston chamber with an open end and a closed end is formed in the seat body, the piston is slidably and sealedly arranged in the piston chamber, and forms with the closed end a pressure medium chamber having an opening, the liquid guide piercing tube is arranged on a surface of the piston that faces the open end, and the piston is provided with a liquid inlet passage in communication with the liquid guide piercing tube; where the piston has an open position where the liquid guide piercing tube is away from the beverage capsule and a locked position where the liquid guide piercing tube pierces the beverage capsule, and the piston may move from the open position to the locked position under the pressure of a medium in the pressure medium chamber.

With the above technical scheme, since the piston is slidably and sealedly arranged in the piston chamber and can move from the open position to the locked position under the pressure of the medium in the pressure medium chamber, in the open position, the user can place a beverage capsule to be used in the brewing chamber because the liquid guide piercing tube is away from the brewing chamber; then, for example, an external liquid supply system supplies liquid to the pressure medium chamber through the opening so that the pressure in the pressure medium chamber increases and the piston is driven to move from the open position towards the locked position; in the locked position, the piston locks the beverage capsule placed in the brewing chamber, while the liquid guide piercing tube pierces the beverage capsule placed in the brewing chamber and supplies liquid to prepare beverage. After the beverage is prepared, the external liquid supply system stops the liquid supply, and, for example, the medium in the pressure medium chamber flows back and further drives the piston to return to its initial position, or the piston returns to its initial position under the action of an elastic reset member to drive the medium in the pressure medium chamber to flow back, so that the piston returns to the open position, and the user can take out the used beverage capsule. If needed, the user may place a new beverage capsule in the pressure medium chamber again and repeat the above procedures. Thus, with the locking brewing device provided by the present disclosure, the user only has to place and take out beverage capsules, but doesn't have to press and operate the locking brewing device to lock the beverage capsule as in the existing technologies. Therefore, the beverage brewing device has reliable working performance, and the user can lock the beverage capsule conveniently and reliably without performing any pressing operation.

Furthermore, the liquid inlet passage is formed by a tube arranged inside the pressure medium chamber, and the opening and an orifice connected to the tube are formed in the closed end.

In addition, the closed end is a piston body that can be detachably assembled to the seat body.

Furthermore, the piston comprises a piston body and a rod body that serves as the tube, where an axial hollow passage in the rod body serves as the liquid inlet passage, and the rod body extends into and is slidably and sealedly fitted in the orifice.

Furthermore, a protrusion extending toward the pressure medium chamber is formed on the closed end, and the opening that extends axially and the orifice that extends axially are formed in the protrusion, where the rod body extends into and is slidably and sealedly fitted in the orifice.

In addition, an elastic reset member that can drive the piston to return to the open position is arranged between the piston and the seat body, where the elastic reset member is in an energy storage state in the locked position.

Furthermore, a protrusion extending toward the pressure medium chamber is formed on the closed end, a guide space is formed between the protrusion and a side wall of the pressure medium chamber, a guide wall extending toward the pressure medium chamber is formed on the piston, and the guide wall is inside the guide space.

Furthermore, a guide wall extending toward the pressure medium chamber is formed on the piston, a radial extension part is formed on an outer side surface of the guide wall, an axial groove is formed in an inner side surface of the chamber wall of the piston chamber, the radial extension part is inside the axial groove and can move axially along the axial groove, and the elastic reset member is arranged between the radial extension part and the axial groove.

In addition, a beverage capsule sealing gasket is provided on the surface of the piston that faces the open end, and the beverage capsule sealing gasket comprises a convex arc surface for abutting against a sealing film of the beverage capsule and an elastic skirt arranged around the convex arc surface for pressing the circumference of the beverage capsule, where the liquid guide piercing tube penetrates through the convex arc surface.

Furthermore, the liquid guide piercing tube penetrates through the center of the convex arc surface.

Furthermore, a guide groove for drawing out and inserting a guide edge of the material cup is formed in the seat body at the open end of the piston chamber.

Furthermore, a magnet capable of attracting the guide edge of the material cup is arranged at an end of the guide groove.

The present disclosure further provides a beverage brewing device, comprising a material cup with a brewing chamber and the locking brewing device according to any of the above aspects, where the material cup is mounted on the open end, the piston can move from the open position where the liquid guide piercing tube is away from the brewing chamber to the locked position where the liquid guide piercing tube extends into the brewing chamber to pierce the beverage capsule placed in the brewing chamber, under the pressure of the medium in the pressure medium chamber.

Thus, as described above, with the beverage brewing device provided by the present disclosure, the user only has to place and take out beverage capsules, but doesn't have to press and operate the locking brewing device to lock the beverage capsule as in the existing technologies.

Therefore, the beverage brewing device has reliable working performance, and the user can lock the beverage capsule conveniently and reliably without performing any pressing operation.

Furthermore, in a structure of the material cup, a needle disk and a support plate for placing the beverage capsule are provided in the brewing chamber from bottom to top in the height direction of the cup body of the material cup, the needle disk is fixedly arranged with respect to the cup body and has a needle extending upward, where the support plate can move up and down in the height direction of the cup body to toggle between an initial position where the beverage capsule can be placed in the brewing chamber and a locked position where the beverage capsule is pierced, where, in the locked position, the needle passes through the support plate to pierce the beverage capsule placed on the support plate.

Furthermore, in the initial position, the needle is located below the support plate.

Furthermore, the support plate is connected with the needle disk and can slide up and down with respect to the needle disk.

Furthermore, an elastic member is arranged between the support plate and the needle disk, where the elastic member is in an energy storage state in the locked position.

Furthermore, the needle is located at the center of the needle disk, and the elastic member is a spring fitted over the needle.

Furthermore, the needle disk comprises a downward extending cylinder part, the needle passes through a mounting hole in the bottom wall of the cylinder part from the outer side of the cylinder part, extends through the cylinder part and protrudes out of the top surface of the needle disk, where an annular space is formed between the needle and the cylinder part, and the spring is located in the annular space.

In addition, a guide hole is formed in the needle disk, a guide arm is formed on the support plate, and a limiting hook is formed at the front end of the guide arm, where the guide arm is fitted in the guide hole, and, at the initial position, the limiting hook abuts against the bottom surface of the needle disk.

In addition, a flow guide groove extending axially is formed in the external surface of the needle.

In addition, flow guide channels are formed in the top surface of the needle disk and/or the top surface of the support plate.

Finally, the present disclosure provides a beverage machine, which comprises a liquid supply system and the beverage brewing device according to any of the above aspects, where the liquid supply system communicates with the opening and the liquid inlet passage, and supplies liquid to the pressure medium chamber through the opening so that the piston moves from the open position to the locked position where the liquid guide piercing tube pierces the beverage capsule placed in the brewing chamber, and then the liquid supply system supplies liquid to the liquid inlet passage.

Thus, as described above, in use, the user can control the liquid supply system to supply liquid to the pressure medium chamber through the opening first, so that the pressure in the pressure medium chamber increases, and the piston is driven to move from the open position to the locked position where the piston locks the beverage capsule placed in the brewing chamber, while the liquid guide piercing tube pierces the beverage capsule placed in the brewing chamber and supplies liquid to the beverage capsule, so as to prepare beverage. After the beverage is prepared, the external liquid supply system stops the liquid supply, and, for example, the medium in the pressure medium chamber flows back and further drives the piston to return to its initial position, or the piston returns to its initial position under the action of an elastic reset member to drive the medium in the pressure medium chamber to flow back, so that the piston returns to the open position, and the user can take out the used beverage capsule. If needed, the user may place a new beverage capsule in the pressure medium chamber again and repeat the above procedures.

Thus, with the beverage brewing device provided by the present disclosure, the user only has to place and take out beverage capsules, but doesn't have to press and operate the locking brewing device to lock the beverage capsule as in the existing technologies. Therefore, the beverage brewing device has reliable working performance, and the user can lock the beverage capsule conveniently and reliably without performing any pressing operation.

Furthermore, the liquid supply system comprises a control valve, both the opening and the liquid inlet passage communicate with the control valve, and a back pressure valve is provided in a tube line through which the control valve communicates with the liquid inlet passage, where, the back pressure valve is closed when liquid is supplied via the control valve and the opening to the pressure medium chamber, and the back pressure valve is opened to supply liquid to the liquid inlet passage in the locked position when the pressure on the back pressure valve reaches an opening threshold.

In addition, the outlet end of the water pump of the liquid supply system is connected with a four-way valve, where the liquid supply system comprises a water pump and a water tank, where the control valve is a four-way valve, which is arranged at the outlet end of the water pump, with three outlets respectively communicating with the opening, the liquid inlet passage, and the water tank of the liquid supply system, and a solenoid valve is provided between the four-way valve and the water tank, where the solenoid valve is closed when the water pump operates to supply liquid; the solenoid valve is opened when the water pump stops, so that the liquid inside the pressure medium chamber returns via the solenoid valve to the water tank.

Other features and advantages of the present disclosure will be further detailed in the embodiments hereunder.

BRIEF DESCRIPTION OF DRAWINGS

The accompanying drawings, which constitute a part of the present disclosure, are used to provide a further understanding of the present disclosure. The illustrative embodiments of the present disclosure and their description are used to explain the present disclosure, but don't constitute any undue limitation to the present disclosure. In the figures.

REFERENCE NUMBERS

Figure 1:
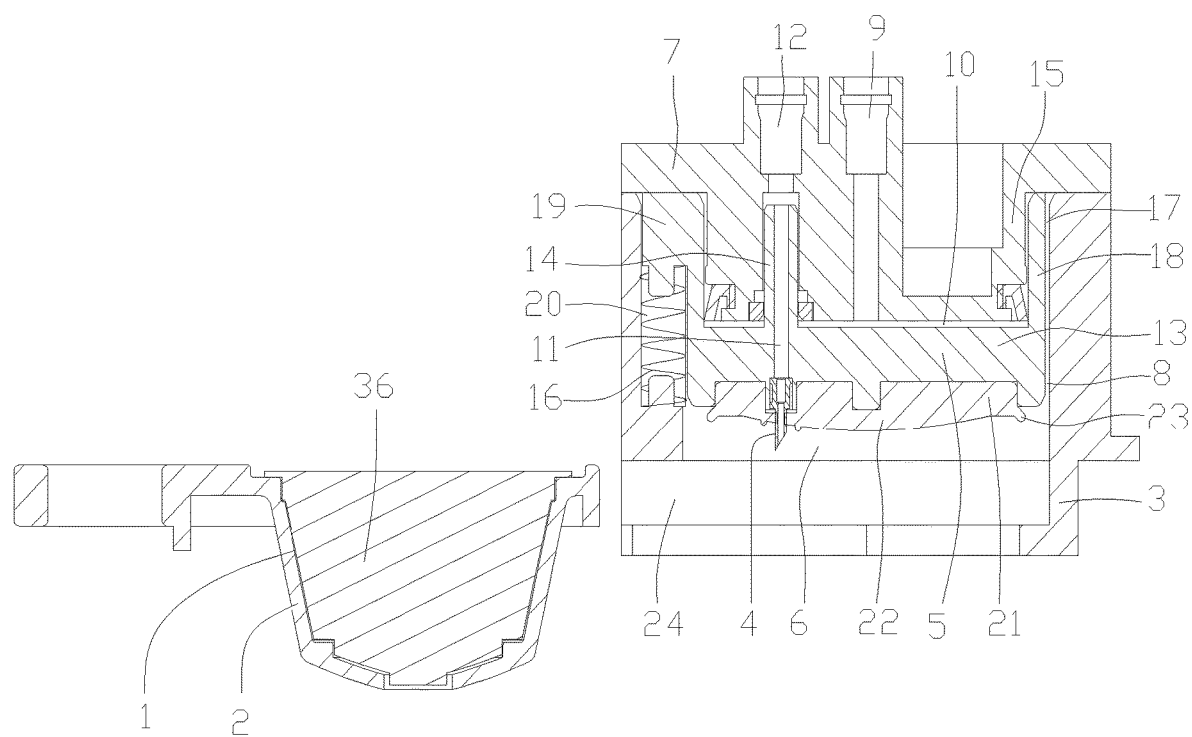
FIG. 1 is a schematic structural diagram of the beverage brewing device according to a preferred embodiment of the present disclosure, where the material cup has been drawn out from the locking brewing device.

1—brewing chamber; 2—material cup; 3—seat body; 4—liquid guide piercing tube; 5—piston; 6—open end; 7—closed end; 8—piston chamber; 9—opening; 10—pressure medium chamber; 11—liquid inlet passage; 12—orifice; 13—piston body; 14—rod body; 15—protrusion; 16—elastic reset member; 17—guide space; 18—guide wall; 19—radial extension part; 20—axial groove; 21—beverage capsule sealing gasket; 22—convex arc surface; 23—elastic skirt; 24—guide groove; 25—needle disk; 26—support plate; 27—needle; 28—elastic member; 29—cylinder part; 30—annular space; 31—guide hole; 32—guide arm; 33—limiting hook; 34—flow guide groove; 35—flow guide channel; 36—beverage capsule; 37—back pressure valve; 38—water pump; 39—four-way valve; 40—water tank; 41—solenoid valve.

DETAILED DESCRIPTION OF THE EMBODIMENTS

Hereunder some embodiments of the present disclosure will be described in detail with reference to the accompanying drawings. It should be understood that the embodiments described here are only provided to describe and explain the present disclosure rather than constituting any limitation to the present disclosure.

It is noted that the embodiments and the features in the embodiments in the present disclosure can be combined freely, provided that there is no conflict between them.

Hereunder the present disclosure will be detailed in embodiments with reference to the accompanying drawings.

As shown in FIGS. 1-4, 7 and 8, the locking brewing device provided by the present disclosure comprises a seat body 3 for mounting a material cup, a liquid guide piercing tube 4 for piercing a beverage capsule in the material cup and delivering liquid, and a piston 5 for locking the beverage capsule in the material cup. A piston chamber 8 with an open end 6 and a closed end 7 is formed in the seat body 3. The piston 5 is slidably and sealedly arranged in the piston chamber 8, and forms with the closed end 7 a pressure medium chamber 10 with an opening 9 through which a medium can flow into the pressure medium chamber 10 or flow out of the pressure medium chamber 10. The liquid guide piercing tube 4 is arranged on a surface of the piston 5 that faces the open end 6, and the piston 5 is provided with a liquid inlet passage 11 in communication with the liquid guide piercing tube 4. The piston 5 has an open position where the liquid guide piercing tube 4 is away from the beverage capsule and a locked position where the liquid guide piercing tube 4 pierces the beverage capsule. The piston 5 can move from the open position to the locked position under the pressure of the medium inside the pressure medium chamber 10.

Of course, in the locking brewing device provided by the present disclosure, the piston chamber 8 and the piston 5 may be circular, elliptical or square. Furthermore, in a case that the piston chamber 8 and the piston 5 are of an elliptical or circular structure, it is easier to reduce the space occupied by the piston chamber 8 and the piston 5. Of course, accordingly the closed end 7 may be circular, elliptical or square, where, in a case that the end face of the closed end 7 is elliptical or circular, the opening 9 and the orifice 12 described below can be formed more easily.

With the technical scheme, since the piston 5 is slidably and sealedly arranged in the piston chamber 8 and can move from the open position to the locked position under the pressure of the medium in the pressure medium chamber 10 (e.g., liquid pressure or gas pressure), in the open position, the user can place a beverage capsule to be used in the brewing chamber 1 because the liquid guide piercing tube 4 is away from the brewing chamber 1; then, for example, an external liquid supply system supplies liquid to the pressure medium chamber 10 through the opening 9 so that the pressure in the pressure medium chamber 10 increases and the piston 5 is driven to move from the open position towards the locked position, where the piston 5 locks the beverage capsule 36 placed in the brewing chamber 1, while the liquid guide piercing tube 4 pierces the beverage capsule 36 placed in the brewing chamber 1 to supply liquid to prepare beverage. After the beverage is prepared, the external liquid supply system stops the liquid supply, and, for example, the medium in the pressure medium chamber 10 flows back and further drives the piston 5 to return to its initial position, or the piston 5 returns to its initial position under the action of an elastic reset member to drive the medium in the pressure medium chamber 10 to flow back, so that the piston returns to the open position, and the user can take out the used beverage capsule 36. If needed, the user may place a new beverage capsule in the pressure medium chamber again and repeat the above procedures. Thus, with the locking brewing device provided by the present disclosure, the user only has to place and take out beverage capsules, but doesn't have to press and operate the locking brewing device to lock the beverage capsule as in the existing technologies. Therefore, the beverage brewing device has reliable working performance, and the user can lock the beverage capsule conveniently and reliably without performing any pressing operation.

It should be understood that the liquid inlet passage 11 in the locking brewing device provided by the present disclosure may be arranged in a variety of forms, as long as external liquid can be introduced into the liquid guide piercing tube 4 through the liquid inlet passage 11; of course, after the liquid guide piercing tube 4 pierces the beverage capsule, the liquid will be introduced into the beverage capsule to brew beverage.

For example, in one structure, flow passages that can communicate with each other can be formed in the piston 5 and the chamber wall of the piston chamber 8. In that case, within the sliding range of the piston 5, the flow passage in the piston 5 may always communicate with the flow passage in the chamber wall of the piston chamber 8, or the flow passage in the piston 5 may communicate with the flow passage in the chamber wall of the piston chamber 8 only when the piston 5 slides to the locked position, so that the external liquid flows through flow passage in the piston 5 and the flow passage in the chamber wall of the piston chamber 8 that communicate with each other into the liquid guide piercing tube 4.

Figure 4:
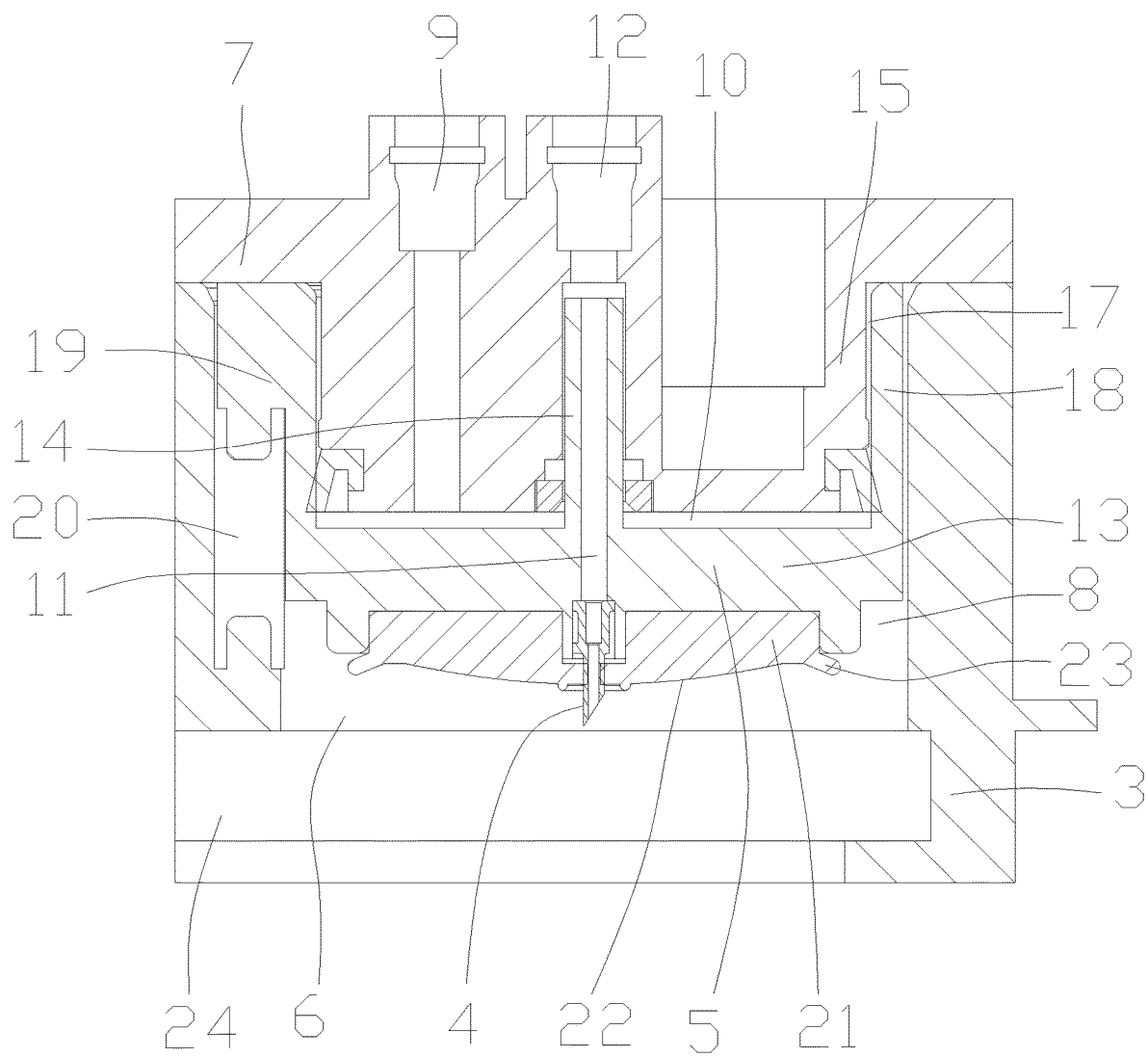
FIG. 4 is another schematic structural diagram of the beverage brewing device according to a preferred embodiment of the present disclosure, where the material cup is not shown.

Alternatively, in another structure, in order to facilitate manufacturing, reduce the production cost, and facilitate assembling, preferably, referring to the structure shown in FIGS. 1 and 4, the liquid inlet passage 11 is formed by a tube arranged in the pressure medium chamber 10. For example, the hollow rod body 14 as shown in FIGS. 1 and 4 may be used; alternatively, in another structure, a hose or bellow may be used, for example, one end of the hose or bellow is connected to a side wall or end wall of the pressure medium chamber 10, and the other end of the hose or bellow is connected to an interface on the piston 5 in communication with the liquid guide piercing tube 4; here, the hose or bellow arranged in the pressure medium chamber 10 has no impact on the slidability of the piston.

In addition, in order to reduce the internal space of the pressure medium chamber 10 occupied by the hose or bellow and increase the sliding stroke of the piston 5, preferably, in the structure shown in FIGS. 1 and 4, the opening 9 is formed in the closed end 7, so that the sliding stroke of the piston 5 is significantly increased when compared with the case that the opening 9 is formed on the side wall of the pressure medium chamber 10. Of course, if needed, the opening 9 may be formed on the side wall of the pressure medium chamber 10. Likewise, an orifice 12 connected to the tube is formed on the closed end 7, so that the hose, especially a bellow, may be connected to the orifice 12 in the pressure medium chamber 10; thus, the bellow is compressed and folded when the piston 5 is in the open position, and is stretched and extends when the piston 5 moves toward the locked position.

Of course, the orifice 12 may be used as a liquid inlet of the liquid inlet passage 11. For example, in the structure shown in FIGS. 1 and 4, the rod body 14 doesn't penetrate through the orifice 12; alternatively, the orifice 12 may be used as a passage. For example, the rod body 14 extends from the pressure medium chamber 10 through the orifice 12 to the outside of the pressure medium chamber 10; for example, the rod body 14 extends into and is slidably and sealedly fitted inside the orifice 12, so that the orifice 12 only serves as a guide and support passage for the rod body 14 when the piston 5 slides.

The closed end 7 may be formed integrally with the seat body 3. Alternatively, in order to facilitate processing and assembling, preferably, in order to facilitate assembling, the closed end 7 may be detachably assembled to the seat body 3; for example, the closed end 7 may be formed by another piston body; in other words, the closed end 7 is a piston body detachably assembled with the seat body 3.

In addition, in the locking brewing device provided by the present disclosure, the piston 5 may be a piston body without a rod body simply, as long as the piston body can slide stably and reliably in the pressure medium chamber 10 to adjust the position. In that case, a bellow may be used, for example, one end of the bellow is connected to the orifice 12, and the other end of the bellow is connected to an interface on the piston body, and the liquid guide piercing tube 4 communicates with the interface.

Alternatively, in another structure, the piston 5 may comprise a piston body 13 and a rod body 14 that serves as the above-mentioned tube. As shown in FIGS. 1 and 4, an axial hollow passage in the rod body 14 serves as the liquid inlet passage 11. In that case, the rod body 14 may penetrate through the orifice 12; or as shown below, if the axial length of the orifice 12 is long, the rod body 14 may be slidably and sealedly fitted in the orifice 12. With such fitting between the orifice 12 and the rod body 14, a supporting and guiding function is provided for the sliding of the piston body 13.

Furthermore, to facilitate the connection of the rod body 14, preferably, as shown in FIGS. 1 and 4, the closed end 7 is formed with a protrusion 15 extending toward the pressure medium chamber 10, and an opening 9 extending axially and an orifice 12 extending axially are formed on the protrusion 15, where the rod body 14 extends into and is slidably and sealedly fitted in the orifice 12, as shown in FIGS. 2, 3, 7 and 8.

In addition, as shown above, after the beverage preparation is completed, the piston 5 should move from the locked position to the open position, so that the medium in the pressure medium chamber 10 (e.g., liquid) can flow back, and thereby the piston 5 can be sucked to return to the open position;

Alternatively, an elastic reset member 16 may be connected to the piston 5 to drive the piston 5 to reset; for example, an elastic reset member 16 capable of driving the piston 5 back to the open position may be arranged between the piston 5 and the seat body 3, where the elastic reset member 16 is in an energy storage state in the locked position. When the fluid supply to the pressure medium chamber 10 is stopped, the pressure in the pressure medium chamber 10 will decrease; at that point, the elastic reset member 16 will release elastic energy and drive the piston 5 to reset, and thereby further drive the fluid in the pressure medium chamber 10 to flow back.

Furthermore, as shown in FIGS. 1-4, to further improve the reliability of sliding of the piston 5, preferably, the closed end 7 is formed with a protrusion 15 extending toward the pressure medium chamber 10, a guide space 17 is formed between the protrusion 15 and the side wall of the pressure medium chamber 10, and the piston 5 is formed with a guide wall 18 extending toward the pressure medium chamber 10, such as an annular guide wall 18, where the guide wall 18 is located in the guide space 17; thus, when the piston 5 slides up and down, the guide wall 18 will move axially in the guide space 17 to improve the stability and reliability of sliding of the piston 5.

Figure 3:
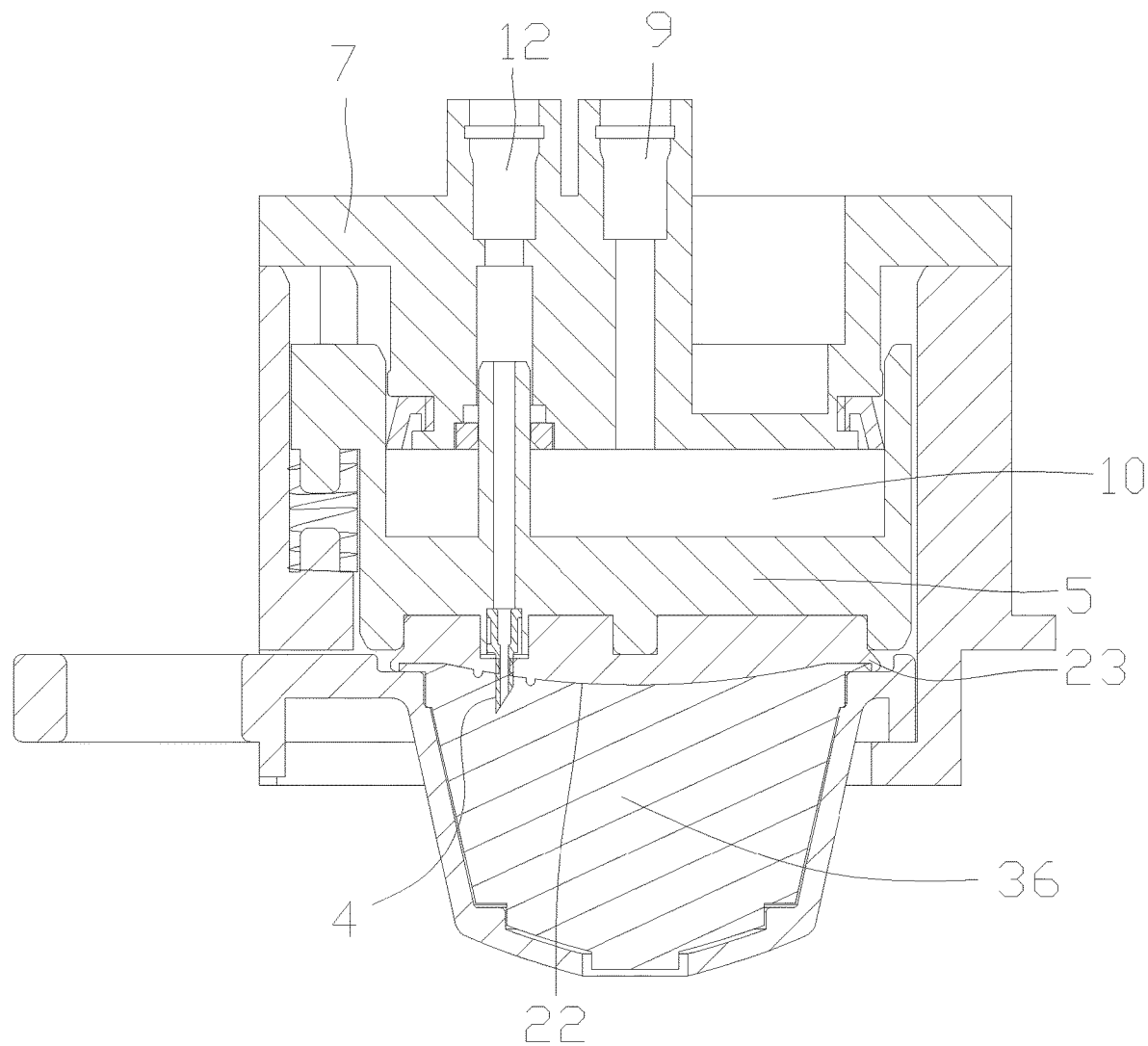
FIG. 3 is a schematic structural diagram of the beverage brewing device in FIG. 1, where the piston is in the locked position.
Figure 8:
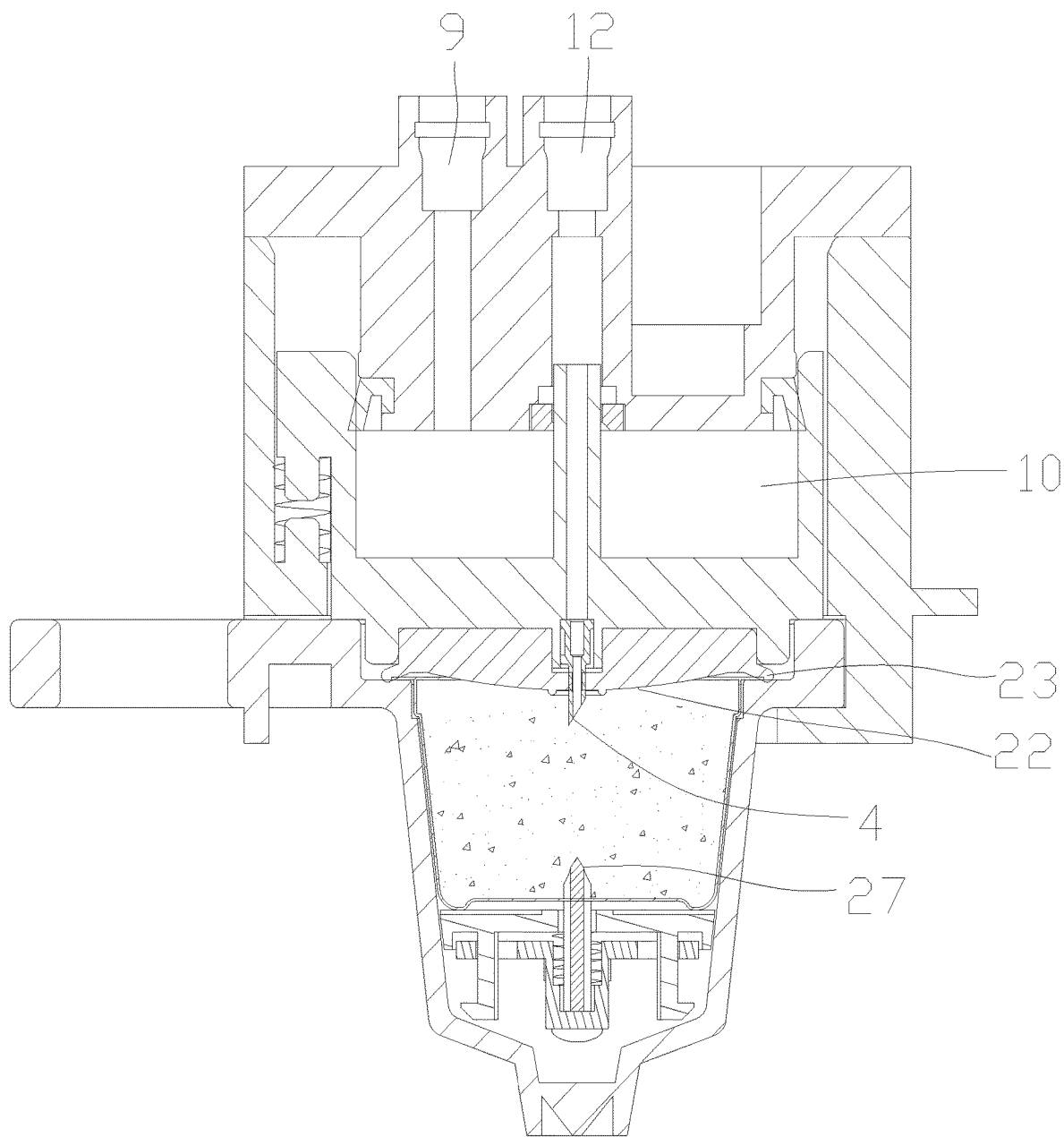
FIG. 8 is a schematic structural diagram of the locking brewing device in FIG. 4 assembled with the material cup in FIG. 5, where both the piston and the support plate are in the locked position.
Figure 9:
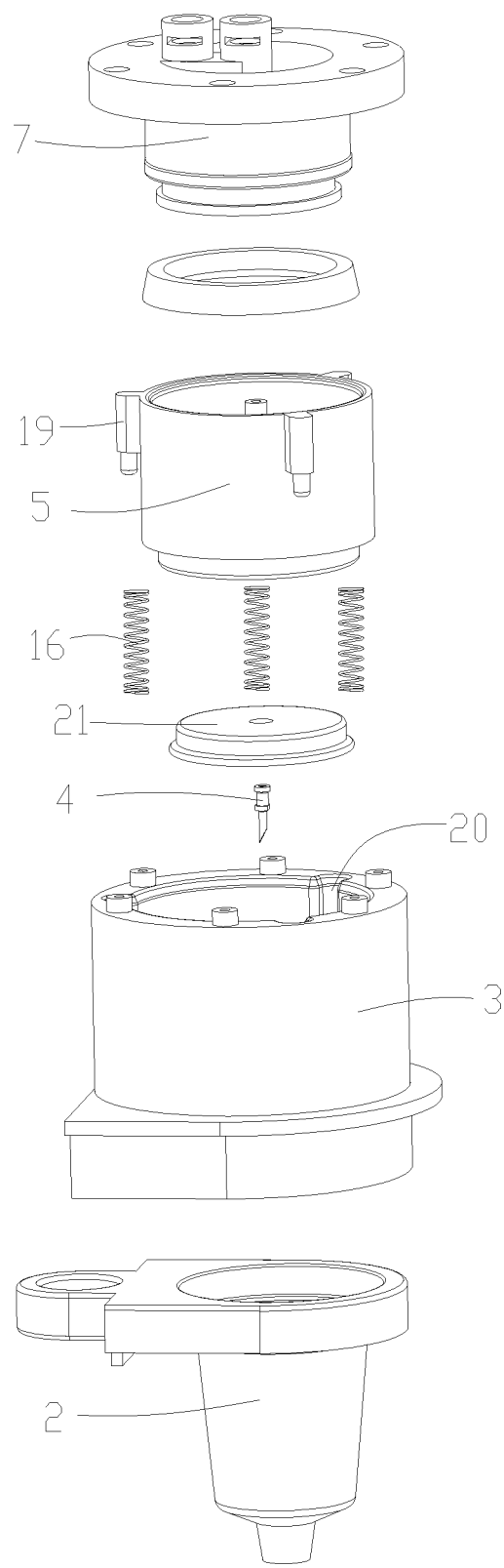
FIG. 9 is an exploded view of the beverage brewing device in FIG. 7 or 8.

Moreover, to avoid the space in the piston chamber 8 occupied by the elastic reset member 16, preferably, as shown in FIGS. 3, 8 and 9, a guide wall 18 extending toward the pressure medium chamber 10 is formed on the piston 5, a radial extension part 19 is formed on an outer side surface of the guide wall 18, an axial groove 20 is formed in an inner side surface of the chamber wall of the piston chamber 8, the radial extension part 19 is inside the axial groove 20 and can move axially along the axial groove 20, and an elastic reset member 16 (e.g., a spring) is arranged between the radial extension part 19 and the axial groove 20. Thus, in the locked position, the elastic reset member 16 will be compressed, as shown in the arrangement in FIGS. 3 and 8; when the spring is connected between the radial extension part 19 and the lower side surfaces of the axial groove 20 or connected between the radial extension part 19 and the upper side surfaces of the axial groove 20, the elastic reset member 16 will be stretched.

In addition, in order to further improve the locking effect of the beverage capsule and facilitate the liquid guide piercing tube 4 to pierce into the beverage capsule easily, preferably, as shown in FIGS. 2, 3, 4, 7 and 8, a beverage capsule sealing gasket 21 is provided on a surface of the piston 5 that faces the open end 6. The beverage capsule sealing gasket 21 comprises a convex arc surface 22 for abutting against a sealing film of the beverage capsule and an elastic skirt 23 arranged around the convex arc surface 22 for pressing the circumference of the beverage capsule, where the liquid guide piercing tube 4 penetrates through the convex arc surface 22, preferably penetrates through the convex arc surface 22 at the center of the convex arc surface 22, or optionally penetrates through the convex arc surface 22 at an off-center position of the convex arc surface 22. Thus, in the locked position, the elastic skirt 23 presses the circumferential edge of the beverage capsule firmly, so that the beverage capsule is locked more reliably; at the same time, the convex arc surface 22 abuts against the sealing film of the beverage capsule, so that the sealing film is in a tensioned state, and thereby the beverage capsule can be positioned more easily and reliably.

Moreover, in the locking brewing device provided by the present disclosure, in order to facilitate placing and taking out the beverage capsule, preferably, the locking brewing device is detachably assembled with the material cup 2. For example, as shown in FIGS. 1 and 4, a guide groove 24 is formed in the seat body 3 at the open end 6 of the piston chamber 8 so that the guide edge of the material cup 2 can be drawn out and inserted laterally. Thus, as shown in FIG. 1, the user may place a beverage capsule in the brewing chamber 1 of the material cup 2, and then insert the material cup 2 laterally along the guide groove 24, so as to fit the material cup 2 into the locking brewing device, as shown in FIGS. 2 and 3.

Furthermore, to facilitate the user to more intuitively feel the placement of the material cup 2 and further ascertain that the material cup 2 is inserted to the correct position, preferably, in the locking brewing device provided by the present disclosure, a magnet capable of attracting the guide edge of the material cup is provided at an end of the guide groove 24. Thus, when the material cup 2 is about to be inserted to the correct position, the magnet will attract the material cup 2, giving the user a more intuitive feeling on the insertion of the material cup 2 to the correct position.

Figure 2:
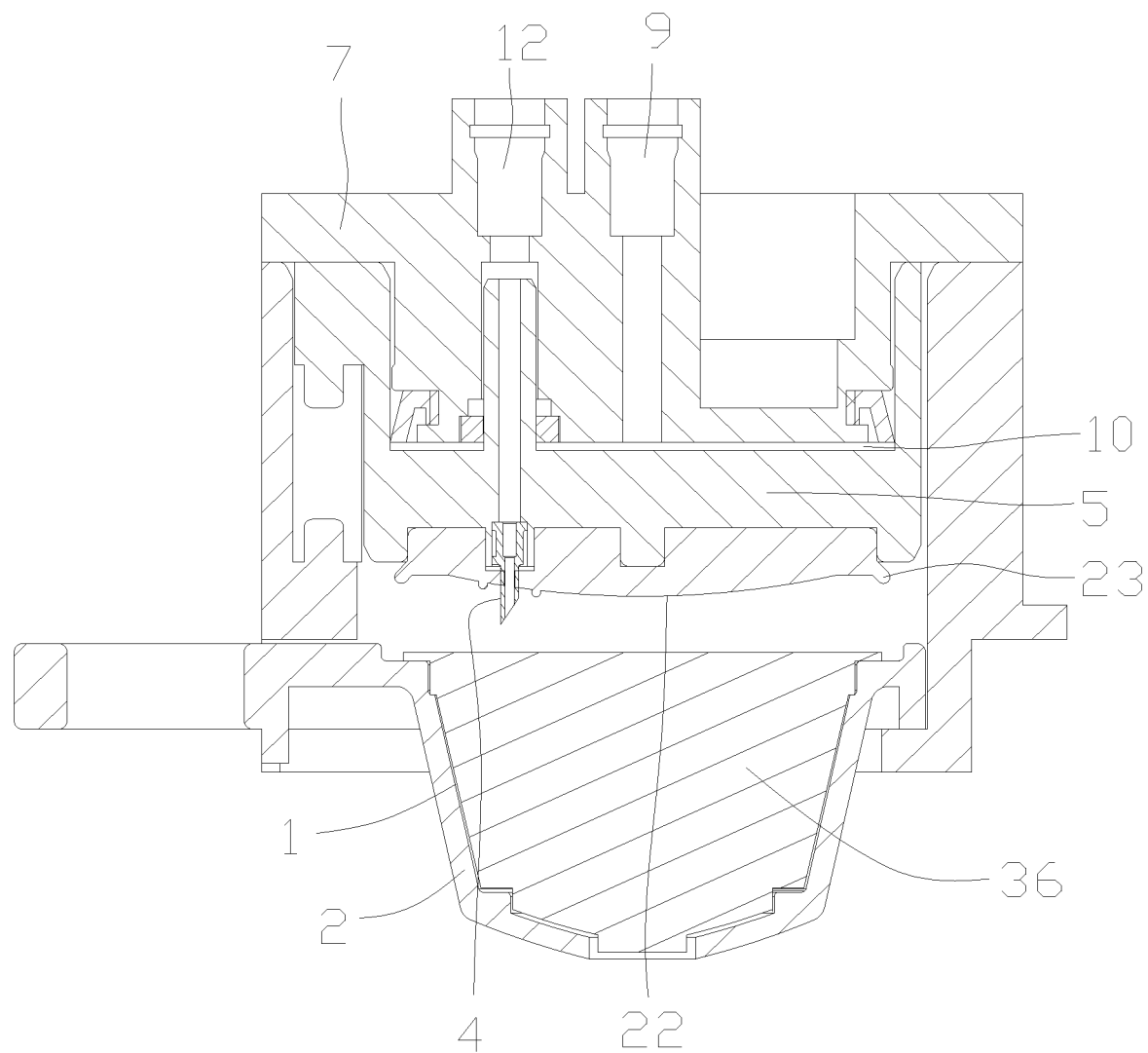
FIG. 2 is a schematic structural diagram of the beverage brewing device in FIG. 1, where the piston is in the open position.

Of course, on the basis of any of the above aspects, the locking brewing device provided by the present disclosure may employ a material cup 2 in any appropriate form, such as the material cup 2 shown in FIGS. 1-3, in which the brewing chamber 1 of the material cup 2 is only used to accommodate a beverage capsule.

In addition, the present disclosure further provides a beverage brewing device, which comprises a material cup 2 with a brewing chamber 1 and the locking brewing device according to any of the above aspects, where the material cup 2 is mounted on the open end, preferably is detachably mounted on the open end, the piston 5 can move from the open position where the liquid guide piercing tube 4 is away from the brewing chamber 1 to the locked position where the liquid guide piercing tube 4 extends into the brewing chamber 1 to pierce the beverage capsule placed in the brewing chamber 1, under the pressure of the medium in the pressure medium chamber 10.

Of course, the brewing chamber 1 has a beverage outlet, preferably, in the height direction of the brewing chamber, the beverage outlet is formed at the lowest position of the brewing chamber.

Thus, as described above, with the beverage brewing device provided by the present disclosure, the user only needs to place and take out beverage capsules, but doesn't have to press and operate the locking brewing device to lock the beverage capsule as in the existing technologies.

Therefore, the beverage brewing device has reliable working performance, and the user can lock the beverage capsule conveniently and reliably without performing any pressing operation.

Figure 5:
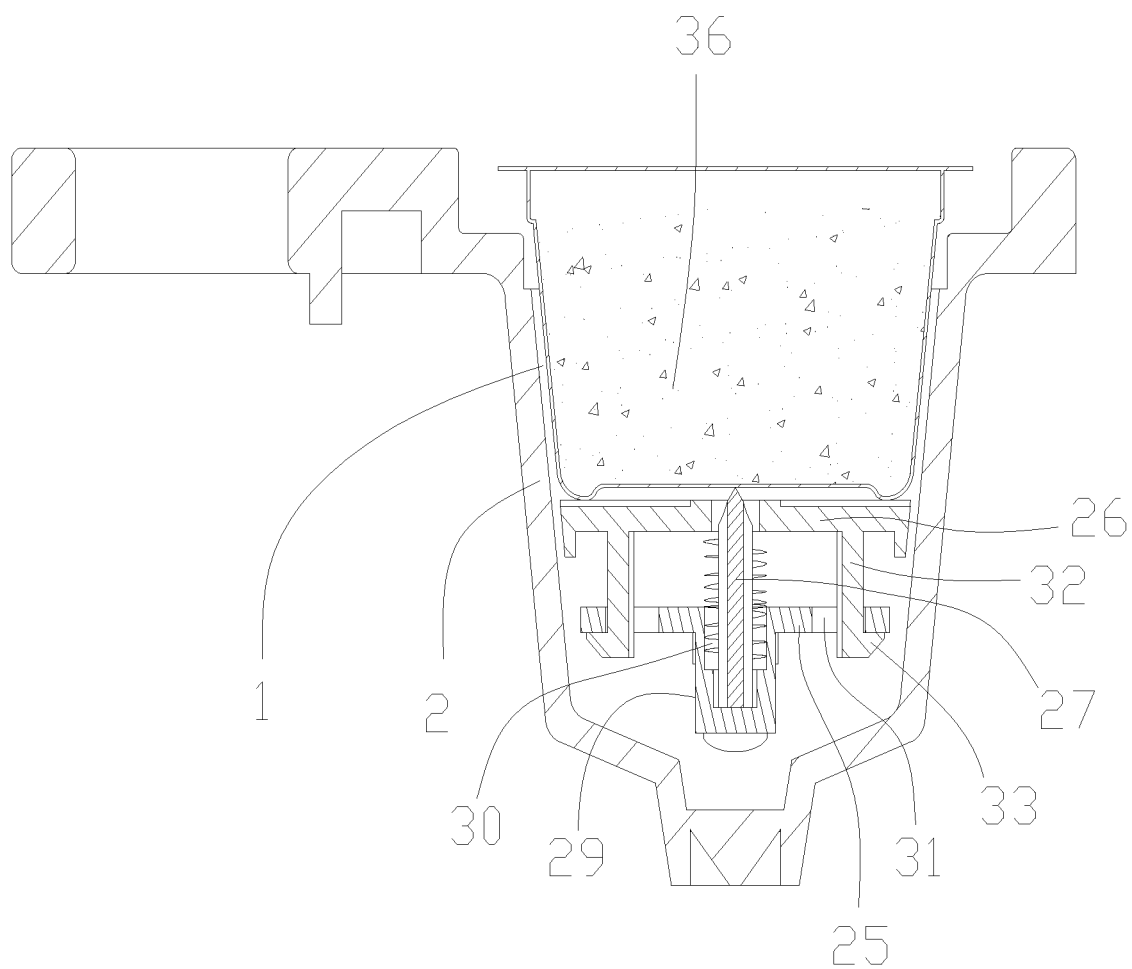
FIG. 5 is another schematic structural diagram of the material cup of the beverage brewing device according to a preferred embodiment of the present disclosure.
Figure 6:
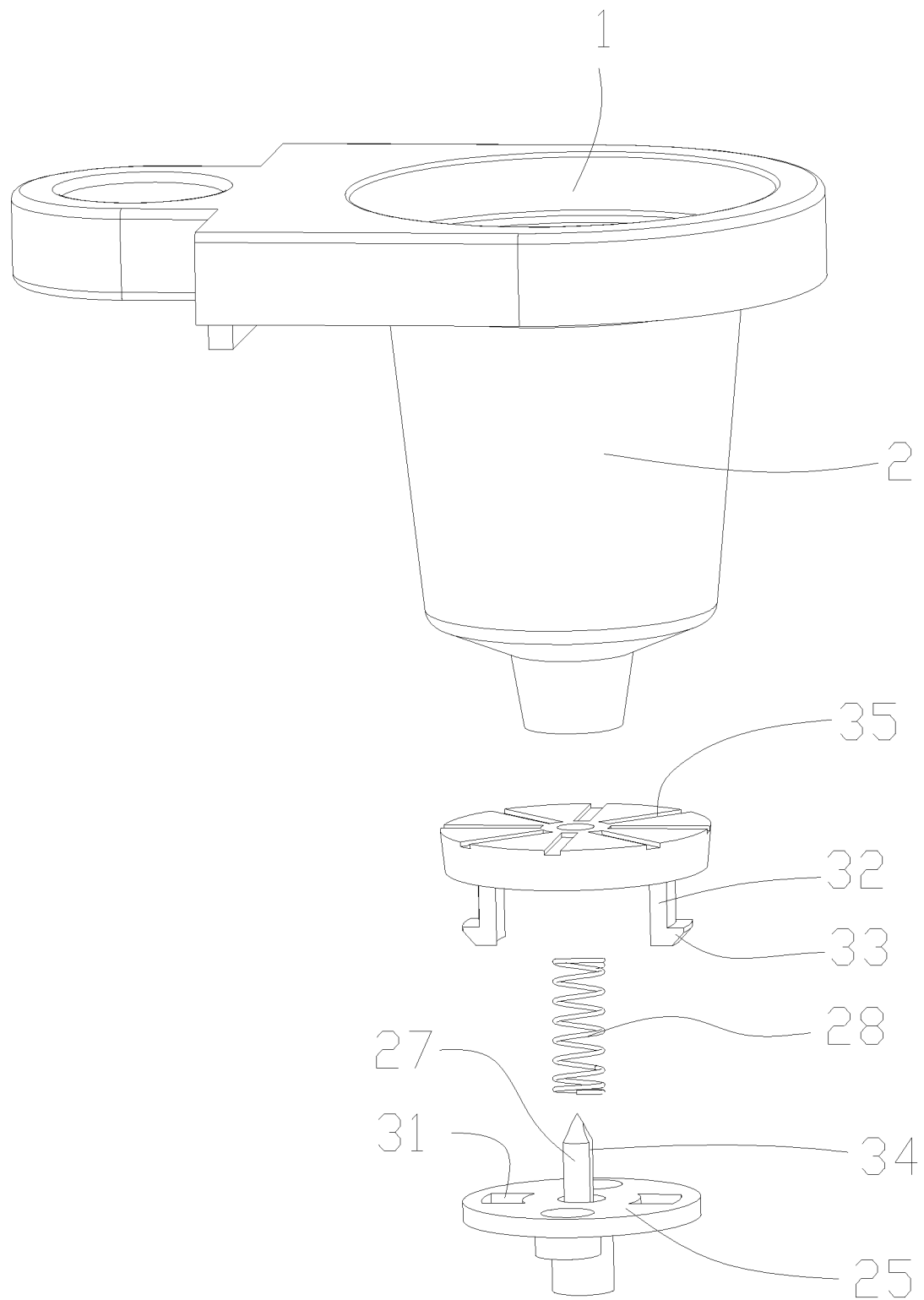
FIG. 6 is an exploded view of the structure in FIG. 5, where the beverage capsule is not shown.
Figure 7:
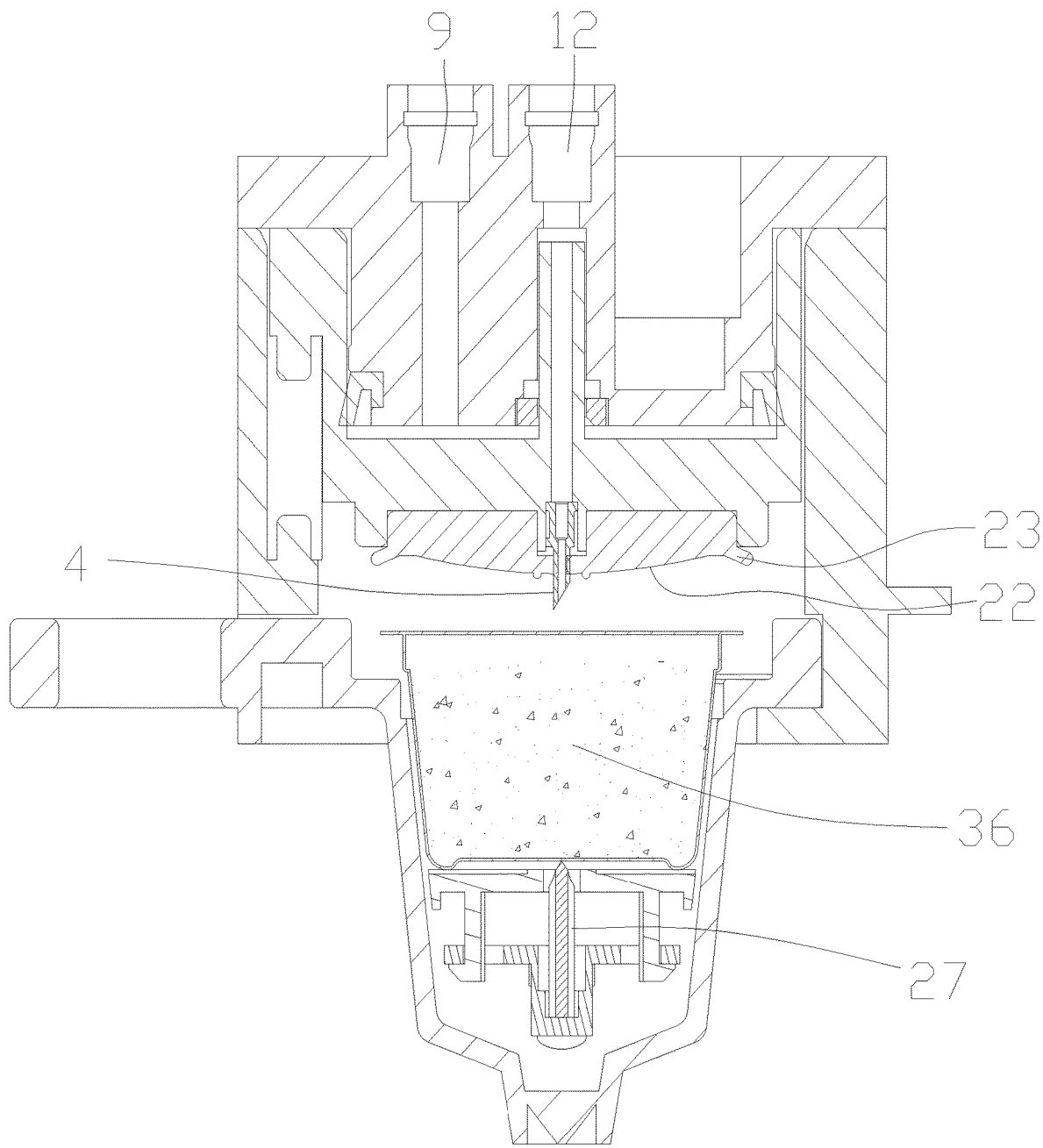
FIG. 7 is a schematic structural diagram of the locking brewing device in FIG. 4 assembled with the material cup in FIG. 5, where the piston is in the open position and the support plate is in the initial position.

In addition, the material cup 2 may employ the structure shown in FIGS. 1-3, or the material cup 2 shown in FIGS. 5-8 may be used. Specifically, as shown in FIGS. 5 and 6, a needle disk 25 and a support plate 26 for placing the beverage capsule are provided in the brewing chamber 1 along the cup body of the material cup 2 from top to bottom in the height direction, i.e., in the height direction of the material cup 2, which is to say, in the height direction of the graphical interface shown in FIG. 5, the needle disk 25 is fixedly arranged with respect to the cup body and has a needle 27 extending upward, i.e., the needle disk 25 is fixedly arranged, and the needle 27 extends upward; in addition, the support plate 26 is arranged above the needle disk 25, where the support plate 26 can move up and down in the height direction of the cup body to toggle between an initial position where the beverage capsule can be placed and taken (as shown in FIG. 7) and a locked position where the beverage capsule is pierced (as shown in FIG. 8), where, in the locking position, the needle 27 passes through the support plate 26 to pierce the beverage capsule placed on the support plate 26.

Thus, after the beverage capsule is used, the support plate 26 will move from the locked position to the initial position, that is to say, the used beverage capsule will be pushed out from the brewing chamber 1; in the initial position, there is a gap between the edge of the sealing film of the beverage capsule 36 and the sealing film supporting surface of the brewing chamber 1, so that the user can conveniently take the beverage capsule; thus, the user doesn't have to take the beverage capsule directly and inconveniently from the brewing chamber 1 in a state that the beverage capsule is closely fitted with the sealing film supporting surface of the brewing chamber 1, and a problem that the user's hand is scalded by the hot beverage capsule or contaminated by the residual beverage is avoided.

Furthermore, after the beverage capsule is naturally placed on the support plate 26, the needle 27 will not pierce the beverage capsule naturally, even if the needle 27 protrudes from the support plate 26.

To facilitate placing the beverage capsule 36 steadily and levelly, preferably, in the initial position, the needle 27 is below the support plate 26. Thus, the beverage capsule 36 can be placed on the support plate 26 levelly and steadily, and the user's hand will not be injured by the needle 27 since the needle 27 doesn't protrude above the support plate 26.

Of course, in the beverage brewing device provided by the present disclosure, the needle disk 25 may be fixedly connected to the material cup 2, while the support plate 26 may be slidably connected to the material cup 2; alternatively, in order to simplify the structure and effectively utilize the fixedly arranged needle disk 25, preferably, as shown in FIG. 5, the support plate 26 is connected with the needle disk 25, and can slide up and down with respect to the needle disk 25. For example, as shown in FIG. 6, a guide hole 31 is formed in the needle disk 25, a guide arm 32 is formed on the support plate 26, and the guide arm 32 is fitted in the guide hole 31; thus, with the slidable fitting between the guide hole 31 and the guide arm 32, the support plate 26 can slide up and down with respect to the needle disk 25.

In addition, to prevent the support plate 26 from popping out, a limiting structure may be formed between the support plate 26 and the material cup 2. For example, a limiting boss may extend from the side wall of the brewing chamber 1, and the support plate 26 abuts against the limiting boss in the initial position.

Alternatively, a guide hole 31 is formed in the needle disk 25, a guide arm 32 is formed on the support plate 26, and a limiting hook 33 is formed on the front end of the guide arm 32, where the guide arm 32 is fitted in the guide hole 31, and, in the initial position, the limiting hook 33 abuts against the bottom surface of the needle disk 25, so as to limit the position of the support plate 26 in the initial position; especially, in a case that an elastic member is arranged between the support plate 26 and the needle disk 25 as described below, the elastic member can facilitate the support plate 26 to return to its initial position from the locked position, so as to eject the used beverage capsule out of the brewing chamber 1.

As shown above, after the brewing is finished, the return of the support plate 26 may be implemented in a variety of forms. For example, an elastic member may be arranged between the bottom surface of the support plate 26 and the brewing chamber 1; alternatively, as shown in FIG. 5, in order to make full use of the fixedly arranged needle disk 25 to simplify the structure, preferably, an elastic member is arranged between the support plate 26 and the needle disk 25, where, in the locking position, the elastic member is in an energy storage state. Thus, after the brewing is finished and the locking brewing device moves from the locked position to the open position, the elastic member will release elastic force to push the support plate 26 back from the locked position to the initial position, so as to push the used beverage capsule out of the brewing chamber 1.

Of course, the elastic member may be in a variety of structural forms. For example, as shown in FIG. 5, the needle 27 is at the center of the needle disk 25, and the elastic member 28 is a spring fitted over the needle 27. Thus, as shown in FIG. 8, when the support plate 26 is in the locked position, the spring is in a compressed energy storage state.

Furthermore, to facilitate assembling the spring stably and reliably, as shown in FIGS. 5 and 8, the needle disk 25 comprises a downward extending cylinder part 29, the needle 27 passes through a mounting hole in the bottom wall of the cylinder part 29 from the outside of the cylinder part 29, extends through the cylinder part 29, and then protrudes above the top surface of the needle disk 25, where an annular space 30 is formed between the needle 27 and the cylinder part 29, and the spring is in the annular space 30. Thus, with the limiting function of the annular space 30, the spring can be reliably fitted over and positioned on the needle 27.

Moreover, after the needle 27 pierces the beverage capsule 36, the prepared beverage will flow out along the needle 27. Therefore, to facilitate the outflow of the beverage, preferably, as shown in FIG. 6, a flow guide groove 34 extending axially is formed in the external surface of the needle 27. Thus, the prepared beverage will flow out along the flow guide groove 34 quickly.

In addition, when the beverage flows out, a part of the beverage will flow onto the support plate 26 and the needle disk 25. Thus, as shown in FIG. 6, flow guide channels 35 extending radially are formed in the top surface of the needle disk 25 and/or the top surface of the support plate 26. In that way, the prepared beverage will flow quickly along the flow guide channels 35. Of course, the top surface of the needle disk 25 and/or the top surface of the support plate 26 may extend from the center to the circumference in a downward inclined form in order to increase the beverage flow rate.

Figure 10:
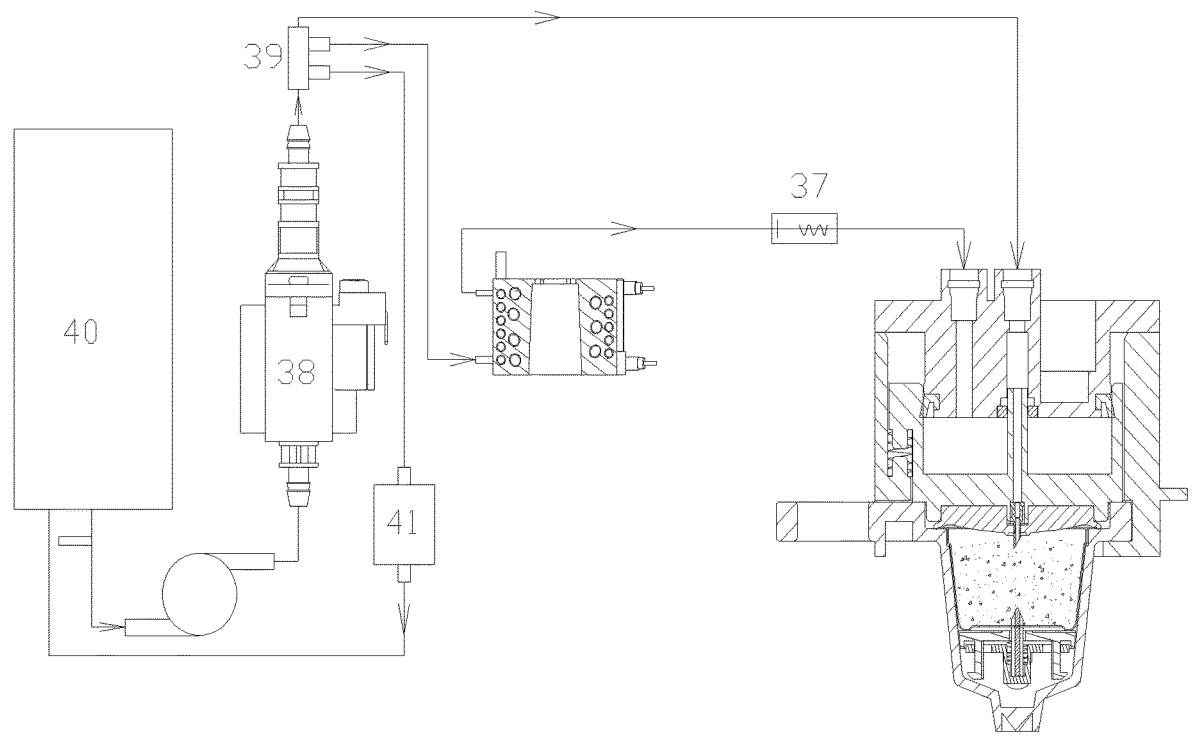
FIG. 10 is a schematic structural diagram of the beverage machine according to a preferred embodiment of the present disclosure, where the beverage brewing device is the beverage brewing device shown in FIGS. 7 and 8.
Figure 11:
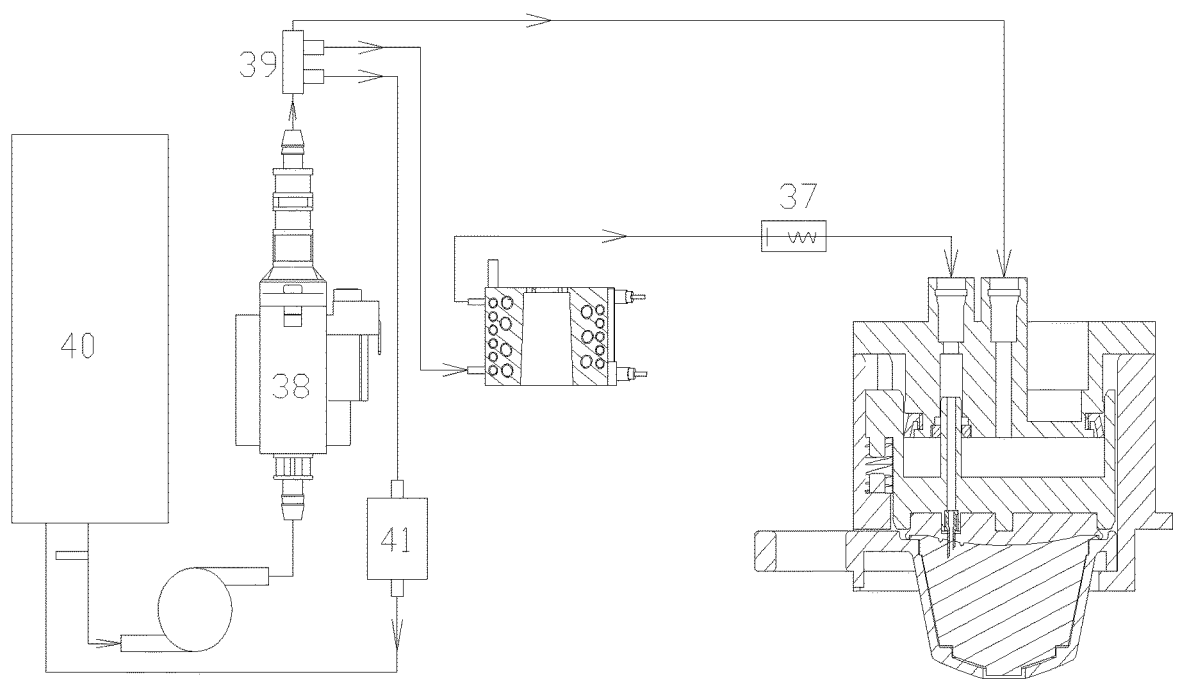
FIG. 11 is a schematic structural diagram of the beverage machine according to a preferred embodiment of the present disclosure, where the beverage brewing device is the beverage brewing device shown in FIGS. 1-3.

The present disclosure further provides a beverage machine. As shown in FIGS. 10 and 11, the beverage machine comprises a liquid supply system and the beverage brewing device according to any of the above aspects, where, when in use, a beverage capsule 36 may be accommodated in the brewing chamber 1, the liquid supply system communicates with the opening 9 and the liquid inlet passage 11, and the liquid supply system first supplies liquid to the pressure medium chamber 10 through the opening 9, so that the piston 5 moves from the open position to the locked position, where, the piston 5 locks the beverage capsule, the liquid guide piercing tube 4 pierces the beverage capsule 36 placed in the brewing chamber, and then the liquid supply system supplies liquid to the liquid inlet passage 11.

Thus, in the open position, since the liquid guide piercing tube 4 is away from the brewing chamber 1, the user may place a beverage capsule to be used in the brewing chamber 1 at this point; then, for example, an external liquid supply system supplies liquid to the pressure medium chamber 10 through the opening 9, so that the pressure in the pressure medium chamber 10 increases, and the piston 5 is driven to move from the open position to the locked position; in the locked position, the piston 5 locks the beverage capsule 36 placed in the brewing chamber 1, while the liquid guide piercing tube 4 pierces the beverage capsule 36 placed in the brewing chamber 1 and supplies liquid to prepare beverage. After the beverage is prepared, the external liquid supply system stops the liquid supply, and, for example, the medium in the pressure medium chamber 10 flows back and further drives the piston 5 to return to its initial position, or the piston 5 returns to its initial position under the action of an elastic reset member to drive the medium in the pressure medium chamber 10 to flow back, so that the piston returns to the open position, and the user can take out the used beverage capsule 36. If needed, the user may place a new beverage capsule in the pressure medium chamber again and repeat the above procedures. Thus, with the beverage machine provided by the present disclosure, the user only has to place and take out beverage capsules, but doesn't have to press and operate the locking brewing device to lock the beverage capsule as in the existing technologies. Therefore, the beverage brewing device has reliable working performance, and the user can lock the beverage capsule conveniently and reliably without performing any pressing operation.

Of course, the liquid supply system may be in a variety of structural forms. For example, in one structural form, the liquid supply system comprises a separate tube line communicating with the liquid inlet passage 11 and a separate tube line connected with the opening 9, and uses separate and different water pumps to supply water.

Alternatively, the liquid supply system may employ a same water pump, and can automatically supply liquid to the pressure medium chamber 10 first, and then automatically supply hot water needed for preparing beverage to the liquid inlet passage 11 after the water supply to the pressure medium chamber 10 reaches a certain degree. Thus, as shown in FIGS. 10 and 11, the liquid supply system comprises a control valve, both the opening 9 and the liquid inlet passage 11 communicate with the control valve, and a back pressure valve 37 is arranged in the tube line through which the liquid supply system communicates with the liquid inlet passage 11, where, when liquid is supplied to the pressure medium chamber 10 via the control valve and opening 9, the liquid will communicate with back pressure valve 37 via the control valve, and at this point, the back pressure valve 37 is closed; in the locked position, when the pressure on the back pressure valve 37 reaches an opening threshold, the back pressure valve 37 will be opened and supply liquid to the liquid inlet passage 11.

Thus, when the liquid supply system supplies liquid to the pressure medium chamber 10, another liquid stream will also flow directly to the back pressure valve 37 via the control valve, or the liquid stream may be heated up, for example, by a heating unit (arranged between the control valve and the back pressure valve 37), and then flow to the back pressure valve 37. At that point, the back pressure valve 37 is closed and bears certain pressure. As the piston 5 moves to the locked position, the pressure on the back pressure valve 37 reaches an opening threshold, and thereby the back pressure valve 37 is opened. In that way, for example, hot water heated by the heating unit enters into the beverage capsule 36 through the liquid inlet passage 11 and the liquid guide piercing tube 4 to prepare beverage.

Of course, when the beverage preparation is completed and the liquid in the pressure medium chamber 10 flows back, the back pressure valve 37 may be closed.

Moreover, to facilitate the backflow of the liquid in the pressure medium chamber 10, preferably, as shown in FIGS. 10 and 11, the liquid in the pressure medium chamber 10 and the liquid for preparing beverage share the same water pump. In that case, in order to facilitate the liquid in the pressure medium chamber 10 to flow back, preferably, the liquid supply system comprises a water pump 38 and a water tank 40, the control valve is a four-way valve, and the four-way valve is arranged at the outlet end of the water pump 38, with three outlets of the four-way valve 39 respectively communicating with the opening 9, the liquid inlet passage 11 and the water tank 40 of the liquid supply system, for example, through tube lines; a solenoid valve 41 is arranged between the four-way valve 39 and the water tank 40, for example, the solenoid valve 41 is connected in the tube line between the four-way valve 39 and the water tank 40, where, when the water pump 38 operates for liquid supply, the solenoid valve 41 is closed; the solenoid valve 41 is opened when the water pump 38 stops, so that the liquid in the pressure medium chamber 10 flows back to the water tank 40 via the solenoid valve 41.

Thus, after the beverage capsule is placed, the water pump 38 operates to pump water, and three tube lines are formed via the four-way valve 39. A first water stream flows to the solenoid valve 41, which is closed at this point; a second water stream flows to the back pressure valve 37 via a heating unit, which is closed; a third water stream flows to the opening 9 and enters into the pressure medium chamber 10, and pushes the piston 5 to move downward from the open position to the locked position to lock the beverage capsule. In the locked position, the liquid guide piercing tube pierces the beverage capsule. At that point, the pressure in the second water supply tube line gradually rises to the opening pressure threshold of the back pressure valve, e.g., 3-5 Bar; then the back pressure valve is opened, and the second water stream is injected into the beverage capsule through the liquid guide piercing tube 4, and beverage brewing is started. After the beverage brewing is completed, the water pump stops; at that time, the solenoid valve 41 is opened, the water in the first tube line returns to the water tank 40, and the piston is reset to the open position, preferably under resilience force of the elastic reset member 16 (e.g., a spring), and thereby a work cycle is completed; if needed, the user may take out the used beverage capsule, for example, preferably by jacking the used beverage capsule out of the brewing chamber 1 by means of the support plate, place a new beverage capsule in the brewing chamber 1, and repeat the above process to brew beverage.

Of course, the liquid supply system may further comprise an appropriate thermistor, such as an NTC, to sense the corresponding aspect of water. For example, an NTC may be arranged in the tube line between the water tank and the heating unit to sense the water inlet temperature; an NTC may be arranged at the water outlet of the heating unit to sense the water outlet temperature.

In addition, it should be noted that the specific technical features described in above specific embodiments may be combined in any appropriate form, provided that there is no conflict among them. To avoid unnecessary repetition, various possible combinations are not described specifically in the present disclosure.

Moreover, different embodiments of the present disclosure may also be combined freely as needed, as long as the combinations don't deviate from the idea and spirit of the present disclosure. Such combinations shall also be deemed as falling in the scope disclosed in the present disclosure.

The invention claimed is:
1. A locking brewing device comprising:
a seat body configured to mount a material cup, a piston chamber with an open bottom end and a closed top end being formed in the seat body;
a piston slidably and sealedly arranged in the piston chamber and configured to lock a beverage capsule in the material cup; and a liquid guide piercing tube arranged at a surface of the piston that faces the open bottom end of the piston chamber and being configured to pierce the beverage capsule in the material cup and deliver liquid;

wherein:

the piston and the closed top end of the piston chamber form a pressure medium chamber having an opening;

the piston includes a liquid inlet passage in communication with the liquid guide piercing tube; and the closed top end of the piston chamber includes the opening of the pressure medium chamber, and an orifice used as a liquid inlet of the liquid inlet passage.

2. The locking brewing device according to claim 1, wherein the piston is configured to move in a direction away from the closed top end of the piston chamber under a pressure of a medium in the pressure medium chamber.

3. The locking brewing device according to claim 1, wherein the opening is formed in the closed top end of the piston chamber.

4. The locking brewing device according to claim 1, wherein:

the liquid inlet passage includes a tube inside the pressure medium chamber; and the orifice connected to the tube is formed in the closed top end of the piston chamber.

5. The locking brewing device according to claim 4, wherein:

the piston includes a piston body and a rod body that serves as the tube;

the rod body includes an axial hollow passage that serves as the liquid inlet passage; and the rod body extends into and is slidably and sealedly fitted in the orifice.

6. The locking brewing device according to claim 5, wherein:

a protrusion extending toward the pressure medium chamber is formed at the closed top end of the piston chamber; and the opening and the orifice are formed in the protrusion and extend axially.

7. The locking brewing device according to claim 1, further comprising:

an elastic reset member arranged between the piston and the seat body, and being configured to drive the piston to move in a direction towards the closed top end of the piston chamber.

8. The locking brewing device according to claim 7, wherein:

an axial groove is formed in an inner side surface of the chamber wall of the piston chamber;

the piston includes:

a guide wall extending toward the pressure medium chamber; and a radial extension part formed at an outer side surface of the guide wall and arranged in the axial groove, the radial extension part being configured to move axially along the axial groove; and the elastic reset member is arranged in the axial groove and abuts against the radial extension part.

9. The locking brewing device according to claim 1, wherein:

a protrusion extending toward the pressure medium chamber is formed at the closed top end of the piston chamber;

a guide space is formed between the protrusion and a side wall of the pressure medium chamber; and the piston includes a guide wall extending toward the pressure medium chamber and arranged inside the guide space.

10. The locking brewing device according to claim 1, further comprising:

a beverage capsule sealing gasket provided at the surface of the piston that faces the open bottom end of the piston chamber, and including:

a convex arc surface configured to abut against a sealing film of the beverage capsule; and an elastic skirt arranged around the convex arc surface and configured to press a circumference of the beverage capsule;

wherein the liquid guide piercing tube penetrates through the convex arc surface.

11. The locking brewing device according to claim 10, wherein the liquid guide piercing tube penetrates through the convex arc surface at a center of the convex arc surface.

12. The locking brewing device according to claim 1, wherein the seat body includes a guide groove at the open bottom end of the piston chamber and configured to allow a guide edge of the material cup to be drawn out or inserted.

13. The locking brewing device according to claim 1, wherein the closed top end of the piston chamber includes a piston body configured to be detachably mounted to the seat body.

14. The locking brewing device according to claim 1, further comprising:

a beverage capsule sealing gasket provided at the surface of the piston that faces the open bottom end of the piston chamber;

wherein:

an outer diameter of the beverage capsule sealing gasket is greater than or equal to an outer diameter of a top surface of the beverage capsule; and the liquid guide piercing tube penetrates through the beverage capsule sealing gasket.

15. A beverage brewing device comprising:

a material cup with a brewing chamber; and a locking brewing device including:

a seat body configured to mount the material cup, a piston chamber with an open bottom end and a closed top end being formed in the seat body;

a piston slidably and sealedly arranged in the piston chamber and configured to lock a beverage capsule in the material cup; and a liquid guide piercing tube arranged at a surface of the piston that faces the open bottom end of the piston chamber and being configured to pierce the beverage capsule in the material cup and deliver liquid;

wherein:

the piston and the closed top end of the piston chamber form a pressure medium chamber having an opening;

the piston includes a liquid inlet passage in communication with the liquid guide piercing tube; and the closed top end of the piston chamber includes the opening of the pressure medium chamber, and an orifice used as a liquid inlet of the liquid inlet passage.

16. The beverage brewing device according to claim 15, wherein:

the material cup is mounted at the open bottom end of the piston chamber; and the piston is configured to move, under a pressure of a medium in the pressure medium chamber, from an open position where the liquid guide piercing tube is away from the brewing chamber to a locked position where the liquid guide piercing tube extends into the brewing chamber.

17. A beverage machine comprising:
a beverage brewing device including:
- a material cup with a brewing chamber; and
- a locking brewing device including:
  - a seat body configured to mount the material cup, a piston chamber with an open bottom end and a closed top end being formed in the seat body;
  - a piston slidably and sealedly arranged in the piston chamber and configured to lock a beverage capsule in the material cup; and
  - a liquid guide piercing tube arranged at a surface of the piston that faces the open bottom end of the piston chamber and being configured to pierce the beverage capsule in the material cup and deliver liquid;
  wherein:
  - the piston and the closed top end of the piston chamber form a pressure medium chamber having an opening;
  - the piston includes a liquid inlet passage in communication with the liquid guide piercing tube; and
  - the closed top end of the piston chamber includes the opening of the pressure medium chamber, and an orifice used as a liquid inlet of the liquid inlet passage; and
- a liquid supply system in communication with the opening of the pressure medium chamber and the liquid inlet passage.

18. The beverage machine according to claim 17, wherein the liquid supply system is configured to:
- supply the liquid to the pressure medium chamber through the opening to drive the piston to move from an open position where the liquid guide piercing tube is away from the brewing chamber to a locked position where the liquid guide piercing tube extends into the brewing chamber to pierce the beverage capsule in the brewing chamber; and
- supply the liquid to the liquid inlet passage when the piston is at the locked position.

19. The beverage machine according to claim 17, wherein:
- the liquid supply system includes a control valve in communication with the opening of the pressure medium chamber and the liquid inlet passage; and
- a back pressure valve is provided in a tube line connecting the control valve and the liquid inlet passage, the back pressure valve being configured to:
  - be closed when the liquid is supplied via the control valve and the opening to the pressure medium chamber; and
  - be opened to supply the liquid to the liquid inlet passage when a pressure applied to the back pressure valve reaches an opening threshold.

20. The beverage machine according to claim 19, wherein:
- the liquid supply system further includes a water pump, a water tank, and a solenoid valve;
- the control valve includes a four-way valve arranged at an outlet end of the water pump, three outlets of the control valve being in communication with the opening of the pressure medium chamber, the liquid inlet passage, and the water tank, respectively;
- the solenoid valve is provided between the four-way valve and the water tank, the solenoid valve being configured to:
  - be closed when the water pump operates to supply the liquid; and
  - be opened when the water pump stops to allow the liquid inside the pressure medium chamber to return to the water tank via the solenoid valve.

* * * * *